(12) United States Patent
Roura Fernandez et al.

(10) Patent No.: US 10,121,102 B2
(45) Date of Patent: Nov. 6, 2018

(54) RFID TAG FOR ITS ARRANGEMENT ON A BLOOD-DERIVATED PRODUCTS BOTTLE AND USE OF THE SAME

(71) Applicant: GRIFOLS, S.A., Barcelona (ES)

(72) Inventors: Carlos Roura Fernandez, San Juan Despi (ES); Victor Grifols Roura, Barcelona (ES); Jordi Boira Bonhora, Terrassa (ES)

(73) Assignee: GRIFOLS, S.A., Barcelona (ES)

( * ) Notice: Subject to any disclaimer, the term of this patent is extended or adjusted under 35 U.S.C. 154(b) by 0 days.

(21) Appl. No.: 15/592,684

(22) Filed: May 11, 2017

(65) Prior Publication Data
US 2017/0330065 A1 Nov. 16, 2017

(30) Foreign Application Priority Data
May 13, 2016 (ES) .................................. 201630629

(51) Int. Cl.
*G06K 19/06* (2006.01)
*G06K 19/077* (2006.01)
*A61J 1/05* (2006.01)

(52) U.S. Cl.
CPC ............ *G06K 19/0776* (2013.01); *A61J 1/05* (2013.01); *A61J 2205/60* (2013.01)

(58) Field of Classification Search
CPC .......... A61J 1/10; A61J 1/1425; A61J 1/2089; A61J 1/05; A61J 1/14; A61J 1/1412;
(Continued)

(56) References Cited

U.S. PATENT DOCUMENTS 4,508,236 A * 4/1985 Keilman ............... A61J 1/1425
137/588
4,568,345 A * 2/1986 Keilman ............... A61J 1/1425
215/309
(Continued)

FOREIGN PATENT DOCUMENTS

EP 1964034 B1 2/2012
EP 2 759 962 A1 1/2013
(Continued)

OTHER PUBLICATIONS

Spanish Search Report, dated Sep. 20, 2016, in Spanish Patent Application No. 201630629.
(Continued)

*Primary Examiner* — Thien M Le
(74) *Attorney, Agent, or Firm* — Knobbe, Martens, Olson & Bear, LLP

(57) ABSTRACT

An RFID tag is for arrangement on a bottle for blood-derived products. The bottle includes a main body, the upper end of which includes a neck. The bottle is hermetically sealed by a cap arranged in the upper portion of the neck. The upper portion of the cap includes at least two through-pipes and at least two stiffening ribs that are each connected to the pipes by one of the respective ends thereof. The RFID tag has at least two openings shaped to fit each of the through-pipes, respectively, of the cap such that said RFID tag is positioned on the upper surface of the cap and thus overcomes the obstacle of the through-pipes and the respective stiffening ribs.

10 Claims, 7 Drawing Sheets

(58) Field of Classification Search
CPC .............................. A61J 1/1437; A61J 1/2093; G06K 19/07758; G06K 19/0723; G06K 19/0772; G06K 19/0776
USPC ......................................................... 235/492
See application file for complete search history.

(56) References Cited

U.S. PATENT DOCUMENTS

| | | | |
|---|---|---|---|
| 2005/0093678 A1 | 5/2005 | Forster et al. | |
| 2012/0025988 A1 | 2/2012 | Harada | |
| 2013/0037616 A1 | 2/2013 | Howell et al. | |
| 2013/0123725 A1* | 5/2013 | Schwarz | B65D 47/2043 604/327 |
| 2014/0128832 A1* | 5/2014 | Larson | A61J 1/18 604/404 |
| 2014/0235364 A1* | 8/2014 | Savarese | G06K 19/041 473/223 |
| 2016/0101019 A1 | 4/2016 | McDowell | |
| 2016/0117585 A1* | 4/2016 | McDowell | G06K 19/07758 206/459.5 |

FOREIGN PATENT DOCUMENTS

| | | |
|---|---|---|
| ES | 2382209 T3 | 6/2012 |
| WO | WO 2012/024971 A1 | 3/2012 |
| WO | WO 2014/197573 A1 | 12/2014 |

OTHER PUBLICATIONS

Extended European Search Report, dated Oct. 5, 2017, in Application No. 17382242.0.

* cited by examiner

RFID TAG FOR ITS ARRANGEMENT ON A BLOOD-DERIVATED PRODUCTS BOTTLE AND USE OF THE SAME

PRIORITY AND CROSS-REFERENCE TO RELATED APPLICATIONS

This application claims the benefit of Spanish Application No. P 201630629, filed on May 13, 2016, which is hereby incorporated by reference in its entirety.

BACKGROUND

Field

The present invention relates to the field of containers for blood-derived products and to suitable means for the traceability, monitoring and identification thereof.

In particular, the present invention relates to means for tracing, monitoring and identifying plastic bottles in which blood-derived products, such as plasma, for example, as well as other types of plasma components, are typically collected and stored.

Description of the Related Art

Bottles of said type are generally used, after the plasma has been collected and stored, for plasma fractionation processes in order to obtain plasma-derived products, such as proteins derived from plasma for therapeutic use, for example, among other products. In said plasma fractionation process, the bottles containing the plasma pass through various sub-processes which form part of the general plasma fractionation process. Consequently, it is vital to ensure the traceability of the bottles and to be able to carry out monitoring and identification of each of said bottles in each of said sub-processes in order to guarantee safety and quality throughout the fractionation process and that of the end products obtained by means of said processes.

With the appearance of systems based on radio frequency identification technology (abbreviated in English as "RFID"), various embodiments have been disclosed which use RFID tags placed on bags for blood and/or health products, allowing, on one hand, a reduction in any necessary human handling and in the percentage of human errors and, on the other hand, greater information storage capacity, by recording and reading the RFID tags in batches, all of which is far superior compared with previous identification systems, such as bar codes, for example.

RFID tag, RFID tag or RFID inlay should be understood throughout the description as a set formed by a printed antenna or layer of conductive material, capable of capturing electromagnetic waves at given frequencies, and an integrated circuit which comprises a non-volatile memory where information is stored and which is capable of being supplied with energy originating from said electromagnetic waves.

The type of plasma bottle which is normally used for collecting and storing plasma and also subsequently in the various plasma fractionation processes is a plastic bottle having a cylindrical body, the upper end of which comprises a short neck which, in turn, is topped by a cap which hermetically seals the bottle, as shown in FIGS. 1, 2 and 3 of the present application. In addition, said cap comprises at least two through-pipes which connect the inside of the bottle to the outside thereof and to which plastic tubes (not shown in the figures) may be connected occasionally. A first pipe allows plasma to enter the bottle and a second pipe provides ventilation and an outlet for the air inside the bottle. In addition, the upper surface of said cap usually comprises at least one rib that is connected to each outer surface of the first and second pipe, respectively, and is intended to provide rigidity to said pipes during the manufacture and handling of the respective plastic tubes and also while the bottle is being used.

There are various embodiments in the prior art in which an RFID tag is arranged on the lower portion or on the cylindrical side wall of a bottle of this type. However, because the electrical field of an electromagnetic wave emitted by an RFID tag tends to be absorbed by liquids, it is not possible with said embodiments to ensure correct reading/writing of data from/to said RFID tags and thus a correct traceability, monitoring and identification of the bottle comprising said RFID tag.

In addition, there is another type of RFID tag in the form of a ring having a concentric central opening for placing on bottles for blood-derived products that have a removable cap, in particular between the neck of the body of the bottle and the removable cap which may close said bottle. However, this type of ring-shaped RFID tag comprising a central opening only has the outer surface of the ring on which to arrange the antenna and associated RFID chip set, and so a significant portion of the potential surface area of the tag is wasted in order to arrange the above-mentioned set, occasionally preventing a greater read/write range of the RFID tag being obtained, which may consequently impede a correct traceability, monitoring and identification of said type of bottle comprising said ring-shaped RFID tag.

SUMMARY

It is therefore advantageous to find a solution which allows said drawbacks to be overcome. In particular, the present invention discloses a RFID tag for arrangement on a bottle for blood-derived products, said bottle comprising a main body, the upper end of which comprises a neck, said bottle being hermetically sealed by a cap arranged in the upper portion of said neck, the upper portion of said cap comprising at least two through-pipes and at least two stiffening ribs that are each connected to said pipes by one of the respective ends thereof. Said RFID tag is characterized in that it comprises at least two openings shaped to fit each of the through-pipes, respectively, of the cap such that said RFID tag is positioned on the upper surface of the cap and thus overcomes the obstacle of said through-pipes and the respective stiffening ribs.

Thus, because the tag has two openings shaped to fit the through-pipes, a greater useful surface area is achieved, including the space between the openings, for arranging the antenna and chip set of the RFID tag, thus allowing a greater read/write range of the RFID tag to be obtained, which allows better traceability, monitoring and identification of said bottle type comprising said RFID tag.

Preferably, the openings of the RFID tag are of the elongate type and have rounded ends that are slightly wider than the larger diameter of the through-pipes. More preferably, the openings of the RFID tag are of the elongate type and have semi-circumferential ends that are slightly wider than the larger diameter of the through-pipes.

Preferably, the openings of the RFID tag are of the elongate type and are arranged symmetrically to one another relative to the central point of the upper surface of the bottle.

Preferably, said RFID tag is circular and has a diameter that is less than the diameter of the circular upper surface of the cap, thus ensuring that the perimeter of the RFID tag, once arranged on the surface, does not project beyond the edge of the circular upper surface of the cap. As the perimeter of the RFID tag does not project beyond the cap, the RFID tag is prevented from being bent, thus ensuring that said RFID tag cannot be removed deliberately or accidentally from the upper surface of the cap.

Preferably, said RFID tag is affixed to the upper surface of the cap by any known means, such as heat staking or permanent acrylic adhesive, for example, thus ensuring that the RFID tag arranged on the upper surface of the cap cannot be bent, creased, lost or even stolen.

Preferably, said bottle for blood-derived products is cylindrical and is made of a plastics material.

An additional object of the present invention is to disclose a use of a RFID tag arranged on a bottle for blood-derived products, according to the present invention, for the identification, monitoring and tracking of said bottle in any phase from the extraction of the plasma from the donor to the plasma fractionation process for obtaining blood-derived products.

BRIEF DESCRIPTION OF THE DRAWINGS

For a better understanding of the invention, the accompanying drawings show an explanatory but non-limiting embodiment of the present invention.

DETAILED DESCRIPTION

Figure 1:
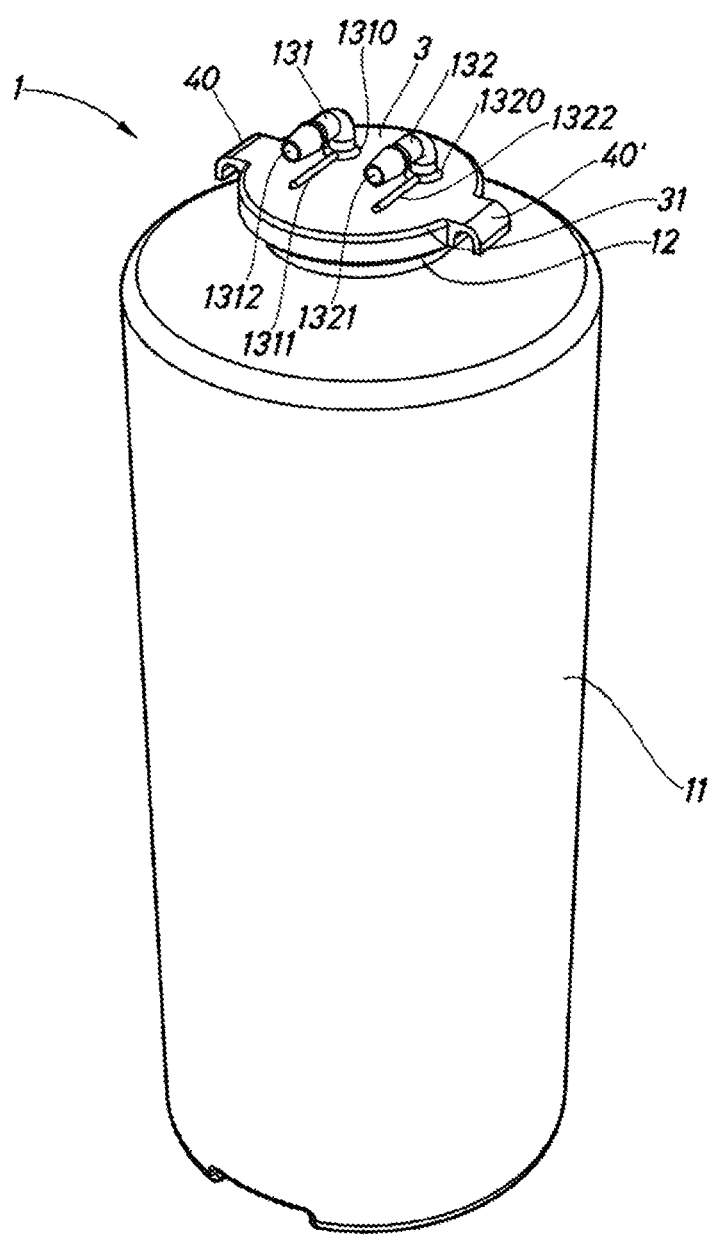
FIG. 1 is a perspective view of a bottle for blood-derived products of the prior art.
Figure 2:
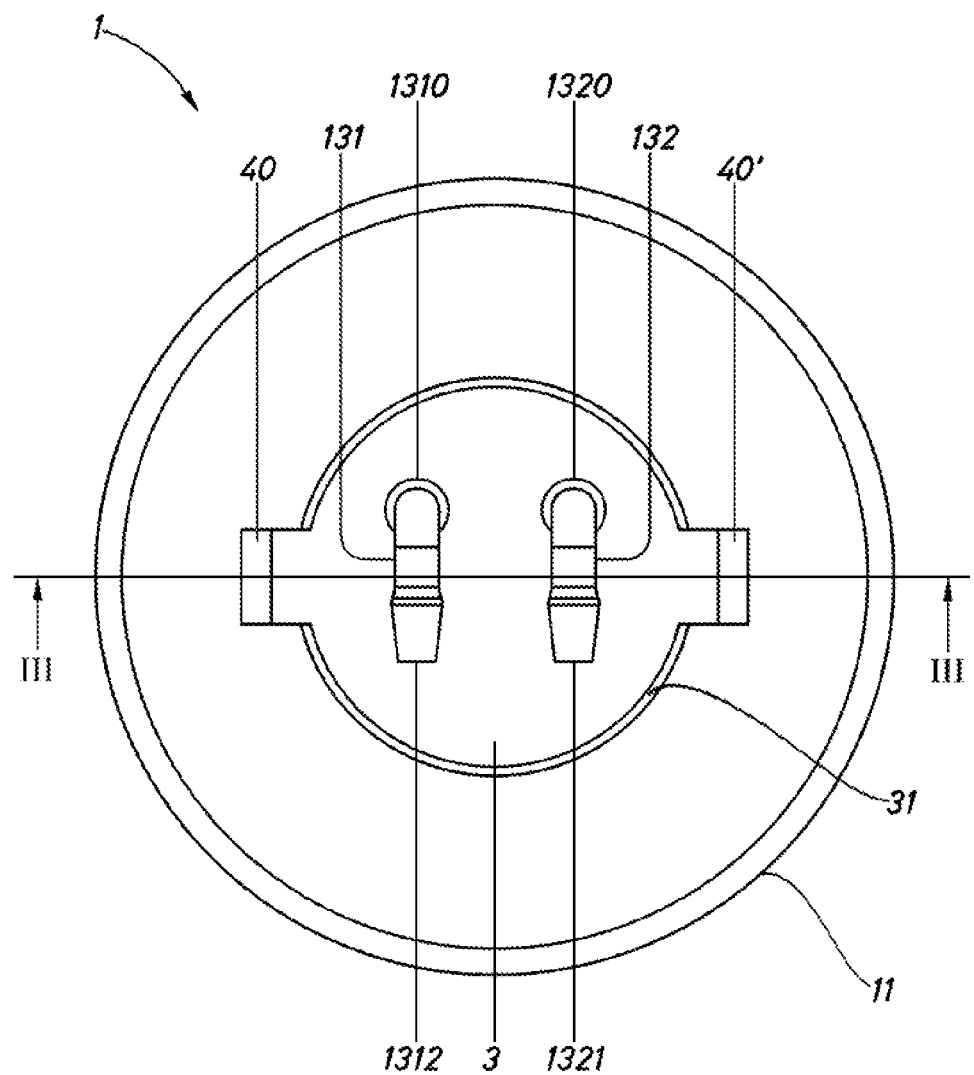
FIG. 2 is a view from above of the bottle from FIG. 1.
Figure 3:
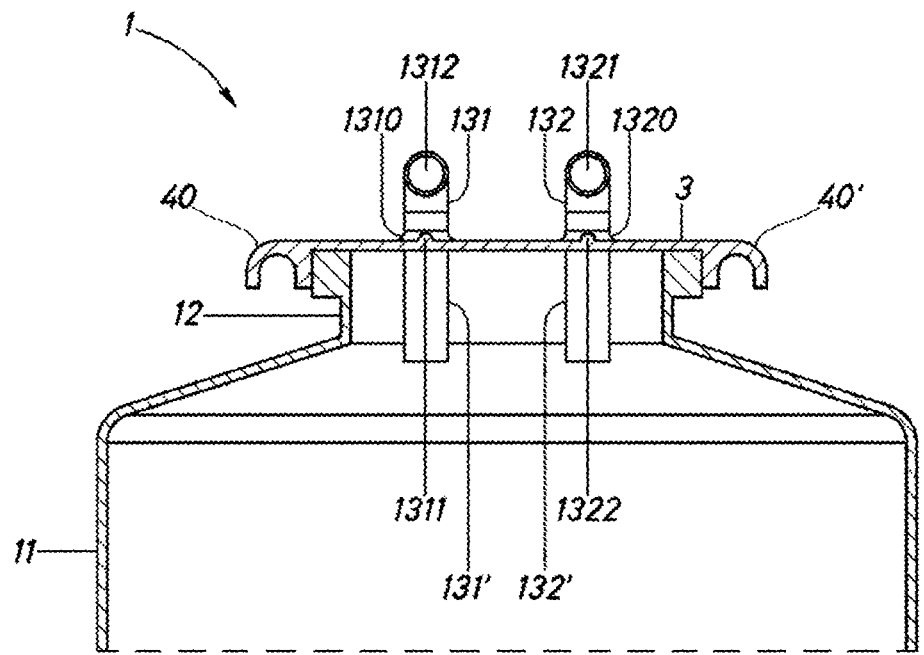
FIG. 3 is a view in cross section along the cutting line III-III' of the view of the bottle from FIG. 2.

FIGS. 1, 2 and 3 show an embodiment of a bottle -1- for blood-derived products, such as plasma, for example, composed of a cylindrical body -11-, the upper end of which comprises a neck -12- which, in turn, is topped by a cylindrical cap -3- which hermetically seals said bottle -1- by the neck -12- thereof. Preferably, said bottle -1- for blood-derived products is cylindrical and is made of a plastics material. The cylindrical cap -3- comprises an outer edge -31- which extends from the perimeter of the upper surface of the cap -3- to the vertical wall of the side surface of said cap -3-. In addition, said cap -3- comprises means (-40-, -40'-) for attaching an outer cap (not shown) for covering the upper surface of the cap -3-. Said attachment means (-40-, -40'-), as shown in the figures, have a U-shaped profile and are arranged on the outer perimeter of the cap -3-.

In addition, said cap -3- comprises on the upper surface thereof at least two through-pipes (-131-, -132-), a first pipe -131- which allows extraction or ventilation and provides an outlet for the air inside the bottle -1-, and a second pipe -132- which allows plasma to enter into the bottle -1-. Each of the through-pipes (-131-, -132-) comprises a distal end (-1312-, -1321-) and a proximal end (-1310-, -1320-), respectively, that are arranged on the upper surface of the cap -3- in connection with the inner pipes (-131'-, -132'-), respectively, of the bottle -1-. Said through-pipes (-131-, -132-) are cylindrical and have a variable radius of revolution or diameter from the respective proximal ends thereof (-1310-, -1320-) to the respective distal ends thereof (-1312-, -1321-). According to this embodiment, the proximal ends (-1310-, -1320-) have a greater diameter than the distal ends (-1312-, -1321-) of both through-pipes (-131-, -132-). In particular, according to this embodiment, the proximal ends (-1310-, -1320-) have the greater diameter of the respective through-pipes thereof (-131-, -132-).

In addition, during handling and use of said type of bottle -1-, each of the tubes (not shown) made of a plastics material which are attached to the distal ends (-1312-, -1321-) of said through-pipes (-131-, -132-), respectively, is commonly connected and disconnected frequently in order to carry out both plasmapheresis and sample extraction. This is why the upper surface of said cap -3- usually comprises a set of ribs (-1311-, -1322-) which are attached to each outer surface of the respective proximal ends (-1310-, -1320-), respectively, of the first -131- and second -132- pipe, respectively, so as to give rigidity to said pipes (-131-, -132-) during handling of said tubes made of a plastics material.

Figure 4:
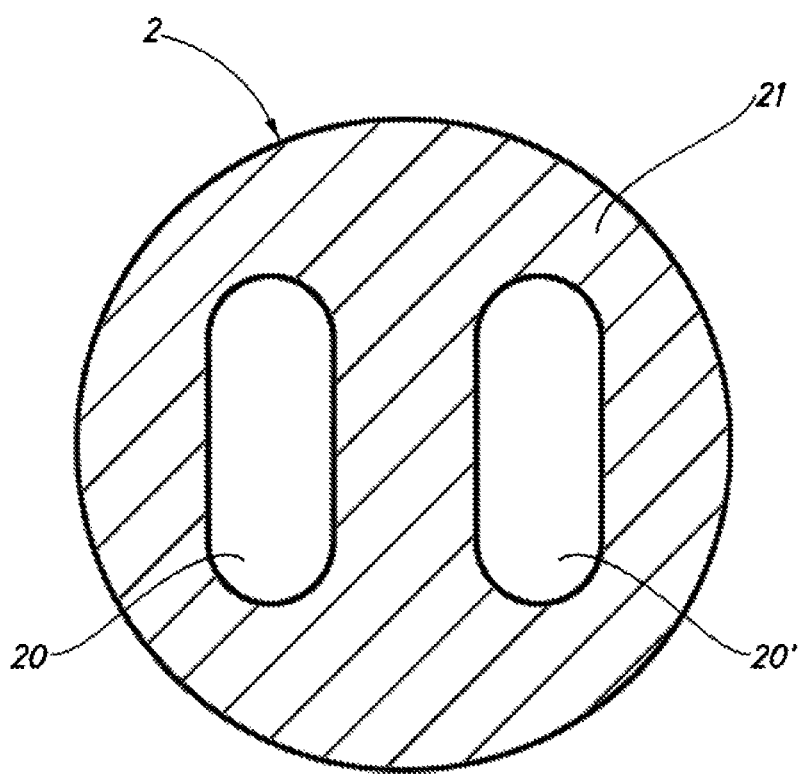
FIG. 4 is a plan view of a RFID tag according to an embodiment of the present invention.

FIG. 4 shows an RFID tag -2-, according to a preferred embodiment of the present invention, which is circular and comprises two openings (-20-, -20'-) arranged symmetrically to one another relative to the central point of the upper surface -21- of said RFID tag -2-. In addition, the openings (-20-, -20'-) are of the elongate type, the ends of which are semi-circumferential. As will be seen below, the diameter of the semi-circumferences of the openings (-20-, -20'-), and consequently the width of the openings (-20-, -20'-), is defined so as to be slightly greater than the diameter of the respective proximal ends (-1310-, -1320-) of the through-pipes (-131-, -132-) of the bottle -1- for blood-derived products. Thus, the openings (-20-, -20'-) are shaped to fit each of the through-pipes (-131-, -132-), respectively, of the cap of the bottle -1-. In addition, the diameter of the circular RFID tag -2- is also defined so as to be slightly less than the diameter of the circular upper surface of the cap -3-.

Figure 5:
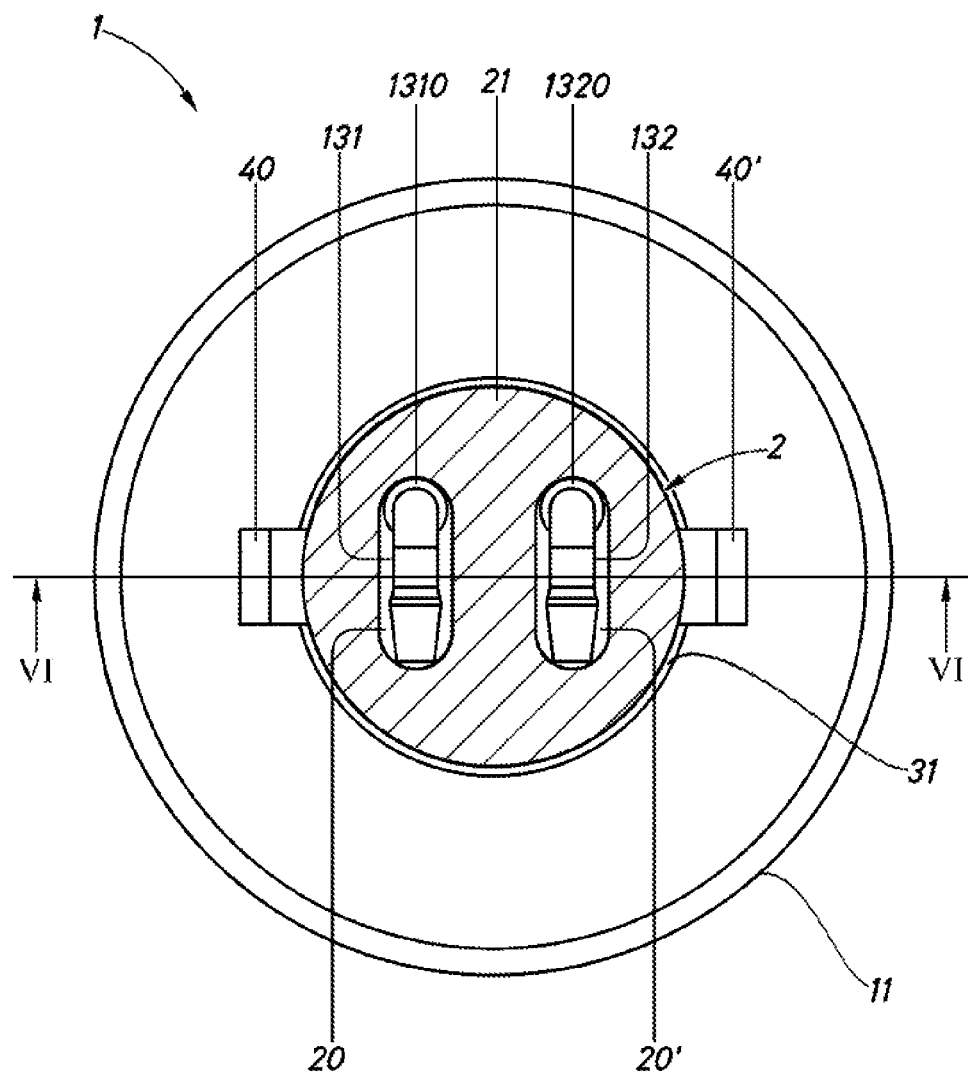
FIG. 5 is a plan view of the RFID tag arranged on the upper surface of the cap of the bottle for blood-derived products from FIG. 1.
Figure 6:
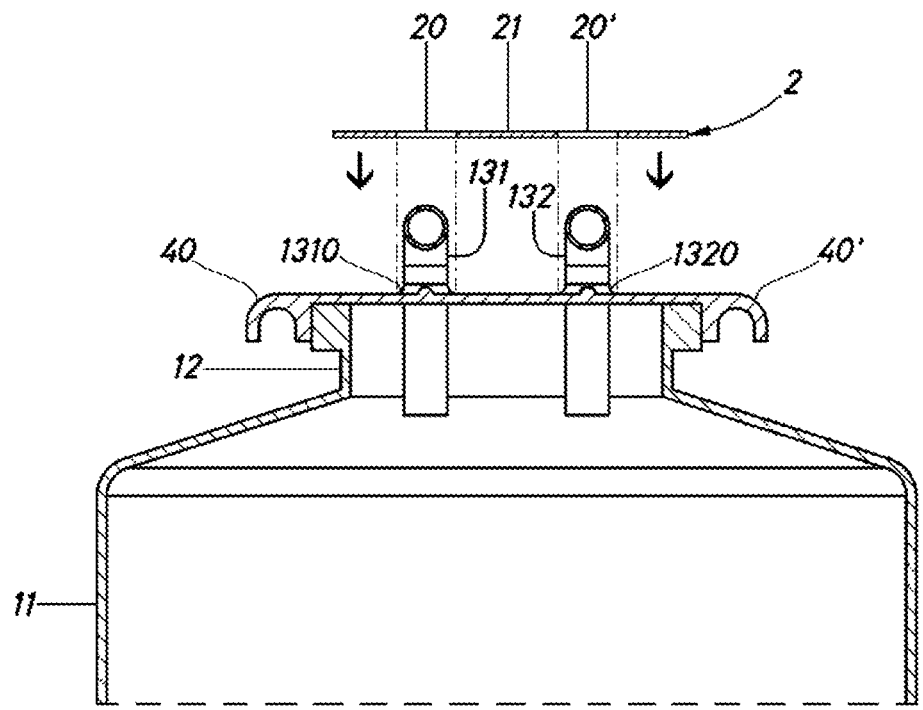
FIG. 6 is an exploded view in cross section along the cutting line VI-VI' from FIG. 5 of the arrangement of the RFID tag on the upper surface of the cap of the bottle.
Figure 7:
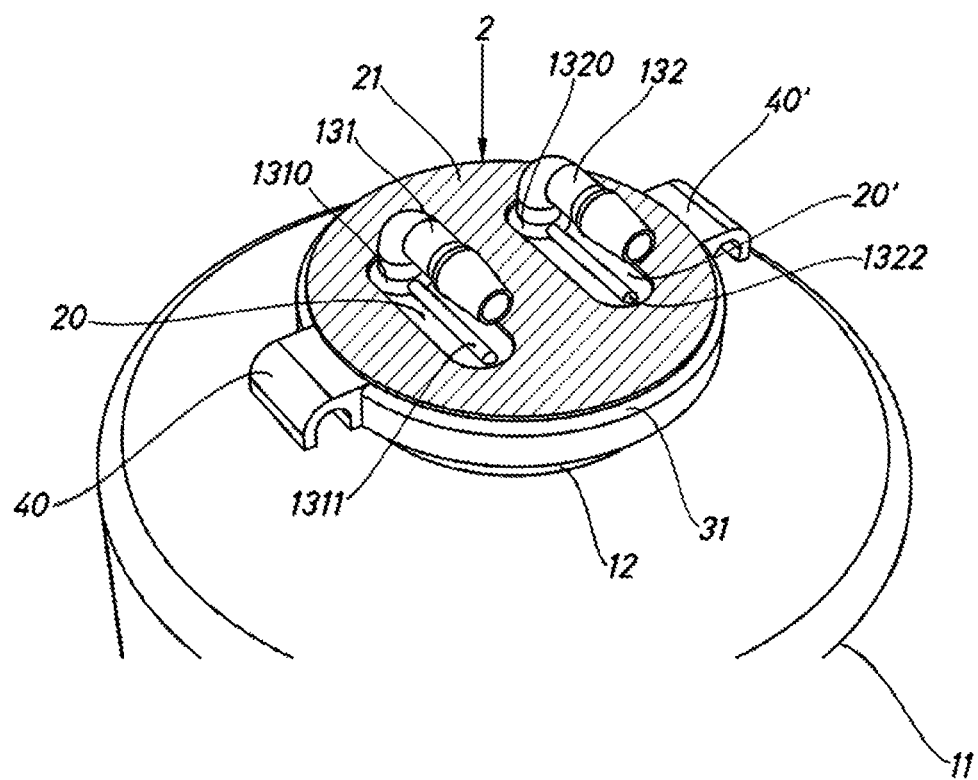
FIG. 7 is a perspective view of the RFID tag arranged on the upper surface of the cap of the bottle for blood-derived products from FIGS. 5 and 6.

As can be seen in FIGS. 5 to 7, the RFID tag -2- is arranged on the upper surface of the cap -3- of the bottle -1- such that the openings (-20-, -20'-) of said RFID tag -2- overcome the obstacle of the through-pipes (-131-, -132-) and the respective stiffening ribs (-1311-, -1322-). To do this, as mentioned earlier, the diameter of the semi-circumferences of the openings (-20-, -20'-), and consequently the width of the openings (-20-, -20'-), is defined so as to be slightly greater than the diameter of the respective proximal ends (-1310-, -1320-) of the through-pipes (-131-, -132-) of the bottle -1- for blood-derived products. In this way, a sufficient width of the openings (-20-, -20'-) is achieved for arranging the RFID tag -2- on the upper surface of the cap -3- of the bottle -1- so as to overcome the obstacle of the through-pipes (-131-, -132-) and the respective stiffening ribs (-1311-, -1322-). This also provides a greater useful surface area, including the space between the openings, for arranging the antenna and chip set of the RFID tag -2-, thus allowing a greater read/write range of the RFID tag -2- to be obtained and in order to achieve better traceability, monitoring and identification of the bottle -1- comprising said RFID tag -2-.

In addition, as can be seen in FIGS. 5 to 7, the diameter of the circular RFID tag -2- is also defined so as to be slightly less than the diameter of the circular upper surface of the cap -3-, thus ensuring that the perimeter of the RFID tag -2-, once arranged on the upper surface of the cap -3-, does not project beyond the edge -31- of the circular upper surface of said cap -3-. As the perimeter of the RFID tag -2- does not project beyond the edge -31- of the cap -3-, the RFID tag -2- is prevented from bending, thus preventing the deliberate or accidental removal thereof from the upper surface of said cap -3-. Moreover, the RFID tag -2- can be affixed to the upper surface of the cap -3- by fixing means such as heat staking, for example, or other fixing means such as permanent acrylic adhesive, for example, thus preventing said RFID tag -2- from being bent, creased, lost and even stolen.

Preferably, the RFID tag -2- will be able to work at ultra high frequency (abbreviated in English "UHF"), which corresponds preferably to a frequency range of between 840 and 960 MHz. In addition, said RFID tag -2- will allow both near field communication (using the magnetic component of the electromagnetic wave) and far field communication (using the electrical component of the electromagnetic wave). In addition, the RFID tag -2- may comprise a combination of antenna elements in the form of an open spiral and/or in the form of a dipolar conductive material capable of capturing the electromagnetic waves at given frequencies, in this case preferably between 840 and 960 MHz. Furthermore, said RFID tag -2- will comprise at least one integrated circuit (not shown) responsible for controlling the reading and writing of data by a RFID tag reader. In addition, said integrated circuit comprises a non-volatile memory (not shown) where the information is stored. Preferably, said integrated circuit will be arranged on the upper surface of the RFID tag -2- between the openings (-20-, -20'-).

In addition, the UHF-type RFID tag -2- will be capable of communicating optimally in a wide range of temperatures, and is therefore an optimal tag for plasma bottle fractionation processes and allows the points of identification to be increased and reinforces the PediGri® traceability system from donation to end product.

Furthermore, the RFID tag -2- may also be of the passive type, i.e. one that does not need a battery to be incorporated in the tag, as the power needed to function is obtained from the field generated by the interrogator or reader of said RFID tag.

Furthermore, the bottle -1- comprising a RFID tag -2- according to the present invention allows said bottle -1- to be identified, monitored and tracked at all times from extraction of the plasma from the donor to the plasma fractionation process for obtaining blood-derived products. In addition, the fact of being able to read RFID tags arranged on the outside of plasma bottles allows, if necessary, intermediate control and check points to be established remotely and automatically in said fractionation process when, for example, the bottles are contained in a box.

Although the invention has been described with respect to preferred embodiments, said embodiments should not be considered to limit the invention, which will be defined by the widest interpretation of the following claims.

What is claimed is:

1. An RFID tag for arrangement on a bottle for blood derived products, said bottle comprising:
   a main body,
   an upper end of which comprises a neck,
   said bottle being hermetically sealed by a cap arranged in an upper portion of said neck,
   an upper portion of said cap comprising a horizontal surface with at least two through-pipes protruding through said horizontal surface and at least two stiffening ribs that are each connected to said through-pipes by one of the respective ends thereof,
   wherein said RFID tag comprises at least two openings shaped to fit each of the through-pipes of the cap, respectively, such that said RFID tag is positioned on the horizontal surface of the cap with the through-pipes and the respective stiffening ribs protruding through said openings.

2. The RFID tag for arrangement on a bottle for blood-derived products, according to claim 1, wherein the openings of the RFID tag are of the elongate type and have rounded ends that are slightly wider than the larger diameter of the through-pipes.

3. The RFID tag for arrangement on a bottle for blood-derived products, according to claim 2, wherein the elongate openings of the RFID tag comprise semi-circumferential ends that are wider than the larger diameter of the through-pipes.

4. The RFID tag for arrangement on a bottle for blood-derived products, according to claim 1, wherein the openings of the RFID tag are arranged symmetrically to one another relative to the central point of the upper surface of the bottle.

5. The RFID tag for arrangement on a bottle for blood-derived products, according to claim 1, wherein said RFID tag is circular and has a diameter that is less than the diameter of the upper surface of the cap.

6. The RFID tag for arrangement on a bottle for blood-derived products, according to claim 1, wherein said RFID tag is affixed to the upper surface of the cap by fixing means using heat staking.

7. The RFID tag for arrangement on a bottle for blood-derived products, according to claim 1, wherein said RFID tag is affixed to the upper surface of the cap by means of permanent acrylic adhesive.

8. The RFID tag for arrangement on a bottle for blood-derived products, according to claim 1, wherein the body of the bottle for blood-derived products is cylindrical.

9. The RFID tag for arrangement on a bottle for blood-derived products, according to claim 1, wherein the bottle for blood-derived products is made of a plastics material.

10. A method for identifying, monitoring and tracking a bottle for blood-derived products, the method comprising providing the bottle comprising an RFID tag according to claim 1, and identifying, monitoring and tracking the bottle during collection, storage, or further processing of the blood-derived products.

* * * * *